May 9, 1933.  F. M. WILLIAMS ET AL  1,908,585

FLOOR MAT

Filed Sept. 17, 1931

Inventor
Francis M. Williams
Earl W. Coble,
By Owen & Owen
Attorneys

Patented May 9, 1933

1,908,585

UNITED STATES PATENT OFFICE

FRANCIS M. WILLIAMS AND EARL W. COBLE, OF TOLEDO, OHIO, ASSIGNORS OF TWO-THIRDS TO THE COMMERCE GUARDIAN BANK, OF TOLEDO, OHIO, A CORPORATION OF OHIO, TRUSTEE

FLOOR MAT

Application filed September 17, 1931. Serial No. 563,349.

This invention relates to floor mats of the link type, wherein the links are pivotally connected together in successive rows and are composed of resilient material, such as soft rubber, and it particularly relates to improvements in the form of link members disclosed in United States Letters Patent, No. 1,797,562, issued March 24th, 1931. In the form of link shown in said patent and heretofore extensively used commercially, considerable difficulty and repair expense has been encountered due to the material breaking down and cracking opposite the openings provided through the links for receiving the pivot wires and for enhancing the resiliency and cushion effect of the links.

The object of this invention is to improve the construction of such links, whereby to strengthen and materially prolong the life and wearing qualities thereof without departing from the advantages incident to the various features of construction of links of this character as defined in said patent, thus enhancing the practicability and commercial value thereof.

The invention is fully described in the following specification, and one embodiment thereof illustrated in the accompanying drawing, in which—

Figure 1:
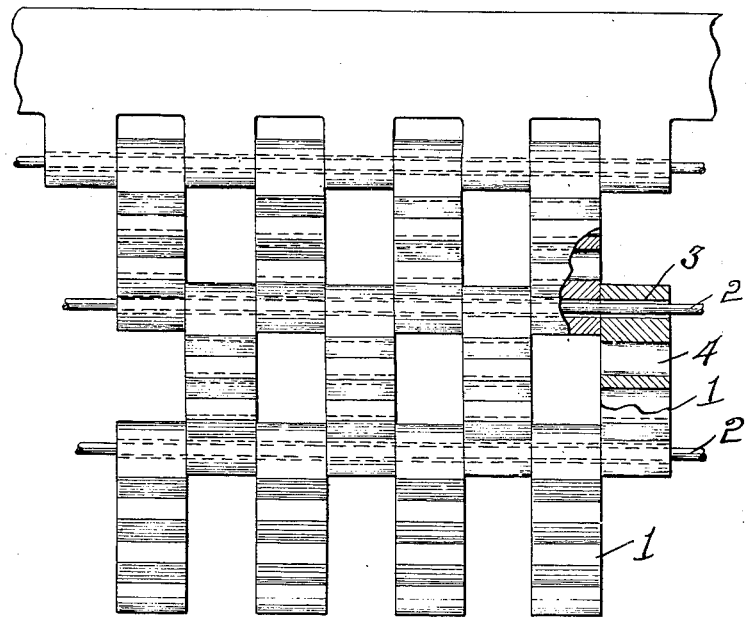
Figure 2:
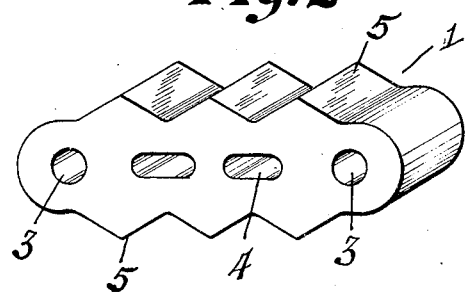

Figure 1 is a fragmentary view of a mat made up of links embodying the invention, and Fig. 2 is an enlarged perspective view of one of the links.

In links of the character described, it is desirable, as defined in said patent, to provide the tread surfaces with transverse ridges and to provide transverse openings through the links in substantially parallel relation to the ridges for the purpose of receiving the pivot or connecting members for the links and to increase the cushion action or resiliency of the links. It is found, however, that a materially better and stronger link is provided, and breaking down of the rubber or other resilient material comprising the links reduced to a minimum, and the life and wearing qualities of the links materially prolonged if the ridges, instead of being disposed directly opposite openings through the links, as illustrated in said patent, are disposed in alternating relation to the openings, so that a solid section of rubber, or the like, is disposed between directly opposed ridges of the links, thus causing the openings through the links to alternate with the pressure lines between opposing ridges.

In the drawing, 1 designates the links of a mat embodying the invention, which links are a resilient material such as soft rubber, and 2 are the pivot rods which pivotally connect the successive rows of links with the links of such rows arranged in alternating relation, as is common with link mats of this character.

Each link 1 is provided transversely through each end with a hole 3 for receiving a pivot member 2, these holes preferably being larger in diameter than the diameters of the pivot members to facilitate resiliency. The link is also provided transversely therethrough between the holes 3 and substantially parallel therewith, with one or more holes 4, in the present instance two in number, to facilitate resiliency of the link.

Each tread surface of the link is provided with a plurality of cross ridges 5, which parallel the holes 3 and 4, and alternate therewith. These ridges correspond in number to the solid portions between the several holes and are arranged in opposing pairs, so that a pressure on one is distributed directly to an opposed supporting surface through the opposed ridge at the opposite side of the link and through the interposed solid portion of the link. It is thus apparent that the lines of pressure between opposing ridges are through solid portions of the link and alternate with the holes. The ridges are all disposed within the area between the holes 3 and are preferably substantially of the cross-sectional V-form shown.

It is found in practice that both the provision of the ridges, and the provision of the holes through the links in substantially parallel relation to the ridges, is important and that by disposing the ridges in such relation to the holes that the lines of pressure between opposing ridges is through the solid portions of the link members between the holes, or alternate with the holes, that the links will stand up a considerably longer time under hard usage than is possible with the forms of resilient links heretofore used, and prevents the resilient material comprising the links from breaking at the holes.

We wish it understood that our invention is not limited to any specific construction, arrangement or form of the parts, as it is capable of various modifications and changes without departing from the spirit of the claims.

Having thus described our invention, what we claim as new and desire to secure by United States Letters Patent is:

1. In a floor mat, a plurality of link members of resilient material, each having a plurality of pairs of opposing ridges on the top and bottom surfaces thereof, and each having a plurality of holes therethrough, substantially paralleling the ridges and alternating with the pressure lines of opposing ridges.

2. In a floor mat, a plurality of link members of resilient material, each having a pivot rod receiving hole near each end and one or more holes therebetween, and each having a plurality of cross ridges on the top and bottom surfaces thereof in parallel relation to and alternating with said holes so that the pressure lines of opposed ridges are through solid portions of the members between the holes.

In testimony whereof we have hereunto signed our names to this specification.

FRANCIS M. WILLIAMS.
EARL W. COBLE.